Feb. 21, 1939. H. V. MITCHELL 2,147,776
SPOOLING AND MEASURING MACHINE
Filed June 11, 1936 5 Sheets-Sheet 2
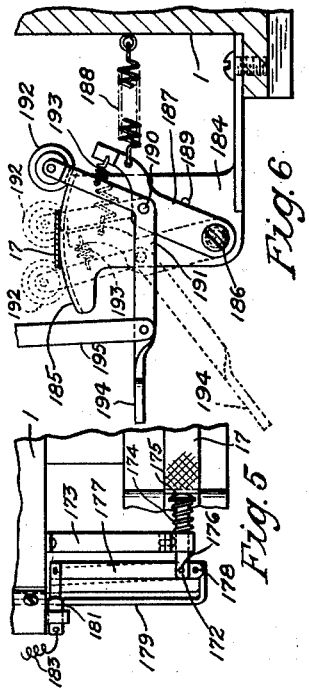
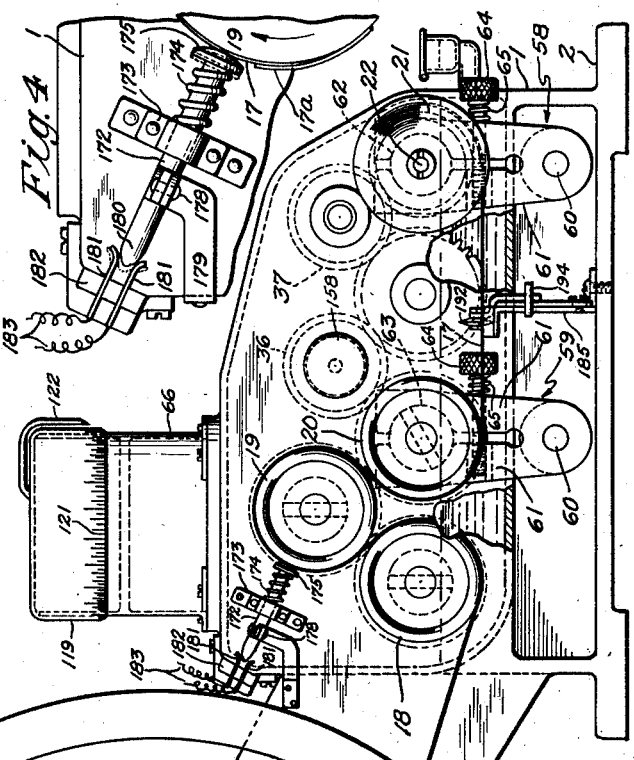
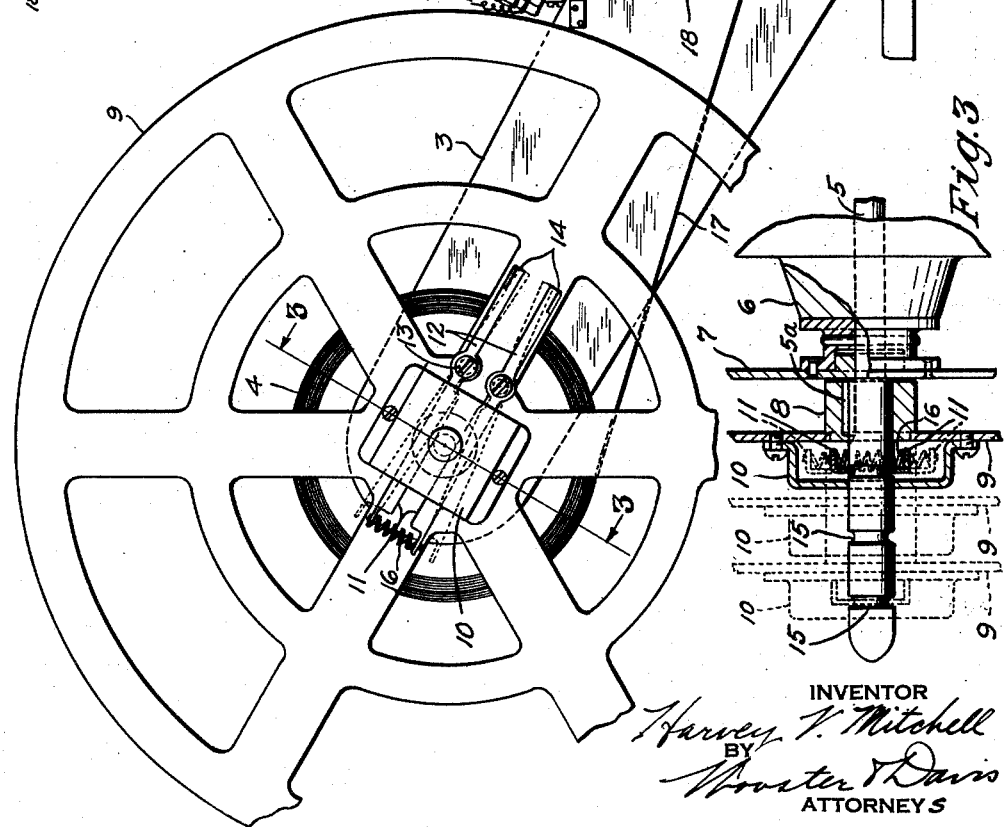
INVENTOR
Harvey V. Mitchell
BY
Wooster T. Davis
ATTORNEYS

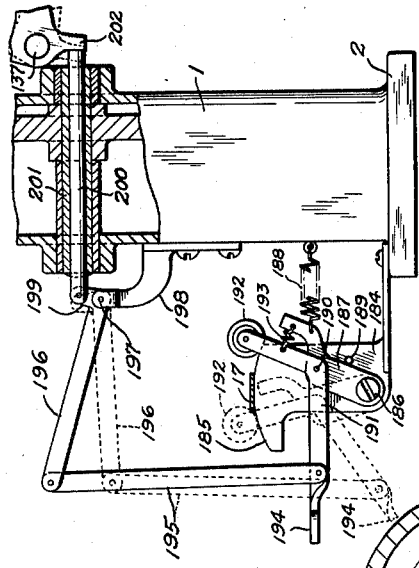
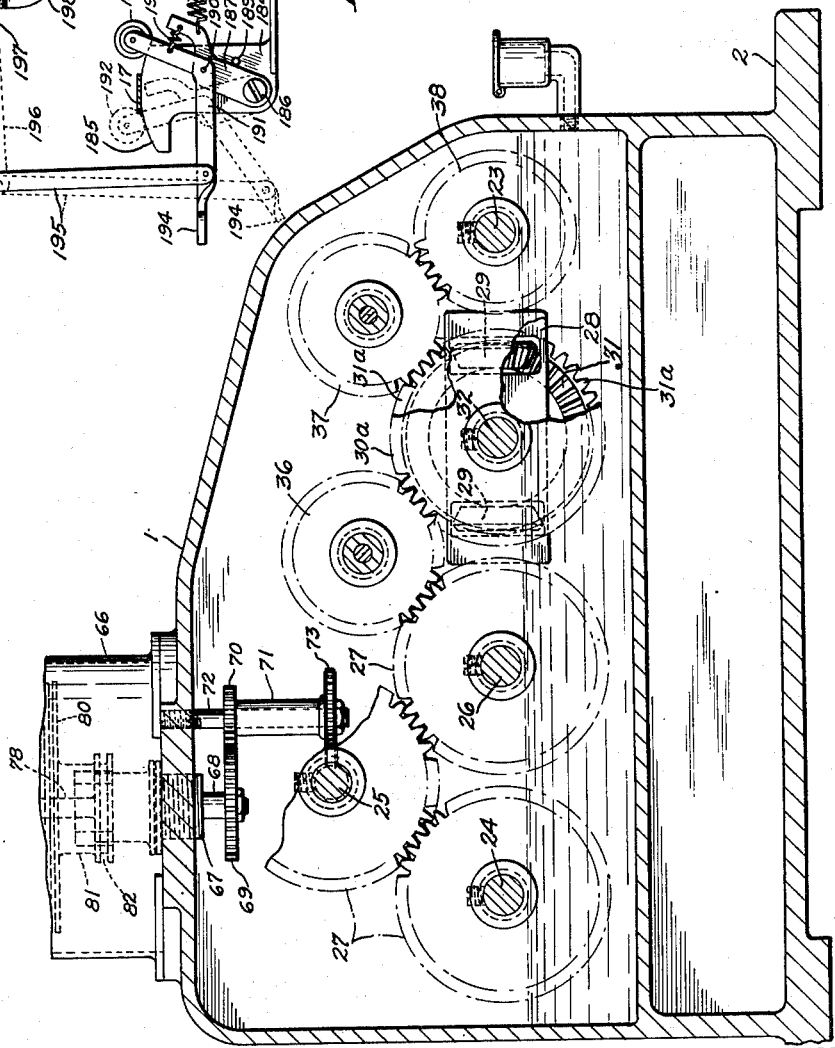

Patented Feb. 21, 1939

2,147,776

UNITED STATES PATENT OFFICE 2,147,776

SPOOLING AND MEASURING MACHINE

Harvey V. Mitchell, Massillon, Ohio, assignor of one-half to Write Incorporated, Bridgeport, Conn., a corporation of Connecticut Application June 11, 1936, Serial No. 84,670

14 Claims. (Cl. 33—131)

This invention relates to a spooling and measuring machine for winding ribbon, tape, braid, string, cord, etc. on spools.

It is an object of the invention to provide such a device which will speedily wind and accurately measure the material being wound so that successive reels or spools will contain the same amount of material.

It is another object of the invention to provide in such a device an accurate measuring mechanism which will instantly and automatically stop the winding mechanism when the desired amount of material has been wound.

It is another object of the invention to provide a device of this character in which the measuring mechanism is not driven by strain on the article being wound but is driven by separate driving means so controlled that there is no undue strain on the article being wound and in which the tension on the material is uniform throughout the winding operation.

A further object of the invention is to provide a winding and measuring device constructed so that the tension on the material being wound may be easily and accurately controlled and maintained uniform throughout the winding operation.

A still further object is to provide a mechanism in which the speed of the windup in relation to that of the measuring drum automatically changes as more material is wound on the windup to maintain the same peripheral speeds without putting any strain or stretch on the material being wound.

By way of example I have shown a device arranged for winding a ribbon such as an inked typewriter ribbon, but it will be evident the device is not limited to winding such ribbon but may be used for winding braid, tape, string, cord, strips of paper, wall paper, or any similar articles, and therefore although I describe and claim a mechanism for measuring and winding a ribbon I use the term ribbon in a generic sense as meaning any of these articles.

As indicated in the drawings:

Fig. 2 is a front elevation thereof;

Fig. 3 is a partial elevation and partial section showing details of the support for the supply reel from which the material to be wound is taken;

Fig. 4 is a front elevation of an automatic stop mechanism to stop the device if an overlapped splice in the ribbon passes through the machine;

Fig. 5 is a top plan view of the mechanism of Fig. 4;

Fig. 6 is a side elevation of a cutoff device for the ribbon;

Fig. 7 is a section through the main housing showing a part of the drive mechanism;

Fig. 8 is a partial elevation and partial section showing an automatic cutoff mechanism for the ribbon;

Figure 1:
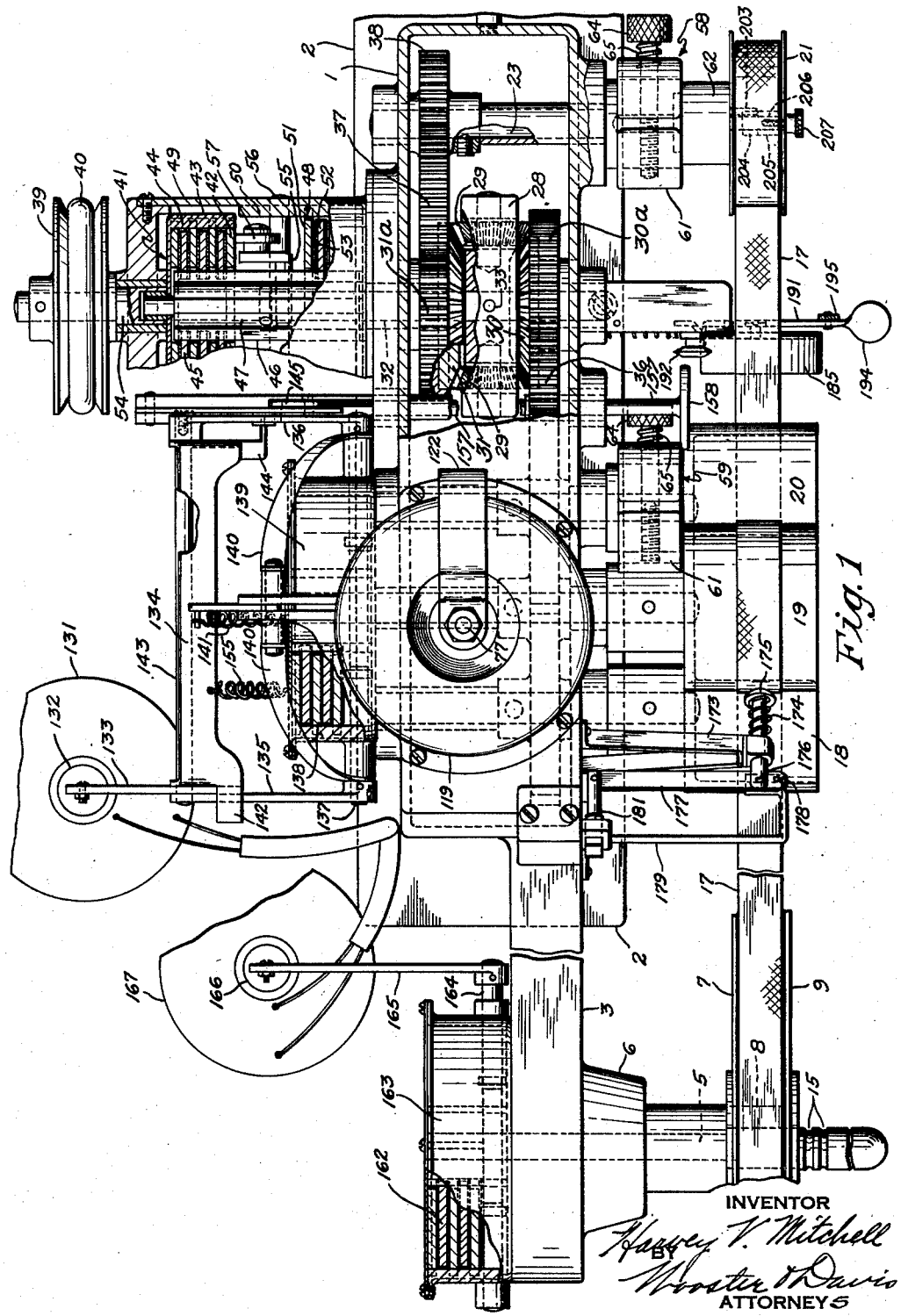
Fig. 1 is a top plan view of one form of my machine with parts broken away to more clearly show the construction.

In measuring and reeling devices it is common practice to drive the windup and then let the pull on the ribbon as it passes through the measuring device drive this measuring device. This puts objectionable strain on the ribbon which may stretch it, and in the case of a typewriter ribbon may cause it to curl, which is very objectionable. It has also been difficult to compensate for variations in the rate of winding of the ribbon as it piles up on the spool or reel. It has further been difficult to accurately measure the ribbon. I have overcome these various objections in my apparatus, but of course it will be understood that the apparatus disclosed in the drawings may be modified within the principles of the invention.

The device as illustrated was designed primarily for winding inked typewriter ribbons onto the spools which are placed in a typewriter, but as indicated above this is used merely by way of illustration and the same principles may be used for measuring and winding other materials, it being merely necessary to modify the elements associated with the article being wound in a manner to accommodate this particular article.

The machine shown comprises a main housing 1 having a base 2 so that it may be mounted on any suitable support. All the various mechanisms are mounted on this housing. At one end is a projecting arm or bracket 3 for carrying the mechanism for supporting the supply reel 4 of the material to be measured and wound, such for example as an inked typewriter ribbon. In manufacturing typewriter ribbons the ribbon after being woven is inked by passing through an inking device and wound in long lengths on reels, but before it can be used in the typewriter it must be rewound on the smaller spools which are placed as such with the ribbon wound on them complete in the typewriter. It is also important that the ribbon be accurately measured so that the desired length of ribbon be wound on the spool with very small variations.

This support for the supply of inked ribbon includes a shaft 5 running in a bearing 6 and carries a side disc 7 permanently secured to the shaft. The reel 4 is placed on center drum 8 attached to a removable disc 9 similar to the disc 7 but which may be removed and applied to the shaft 5. Various ways may be employed to secure the disc 9 and the reel to the shaft. In the present instance a small housing 10 (Figs. 2 and 3) is secured to the outer face of the disc 9, and it encloses a pair of jaws 11 mounted upon the levers 12 pivoted to the disc at 13 having hand grips 14. The shaft 5 is provided with a plurality of spaced grooves 15 into which the jaws 11 may seat to hold the disc 9 on the shaft, a spring 16 holding these jaws in the groove. By merely pressing inwardly on the finger grips 14 the jaws may be removed from the groove and the disc 9 removed from the shaft for applying a new supply reel, after which all that is necessary is to merely force it back on to the shaft until the jaws 11 enter the desired grooves. In this way supply reels of different widths of material may be used on the same support.

The ribbon indicated at 17 is taken from the reel 4 and is passed over three measuring drums 18, 19 and 20 (Figs. 1 and 2). I prefer to use three of these drums although the number may be varied. I also prefer to locate these three drums substantially as shown in Fig. 2, that is in general pyramidal relation with an intermediate drum 19 located between and to one side of, in the present case above, the drums 18 and 20. By this arrangement I can get an extensive contact or engagement between the ribbon and the measuring drums which reduces the liability of slipping to a minimum and gives more accurate measuring of the ribbon. In this the ribbon is carried under the drum 18 upwardly on its right hand side to the left hand side of the drum 19, over the top of this drum and down on the right hand side thereof, over the left hand side of the drum 20 and under this drum to the windup indicated in this instance by the typewriter ribbon spool 21 mounted on a suitable support 22. This support as a whole is mounted on a shaft 23 running in suitable bearings in the housing 1. The measuring drums 18, 19 and 20 are also mounted on suitable shafts 24, 25 and 26 respectively running in bearings in the housing, and on each of these shafts is a spur gear 27 intermeshing with each other so that the three drums 18, 19 and 20 are all driven in unison at a uniform speed.

Differential drive

Figure 10:
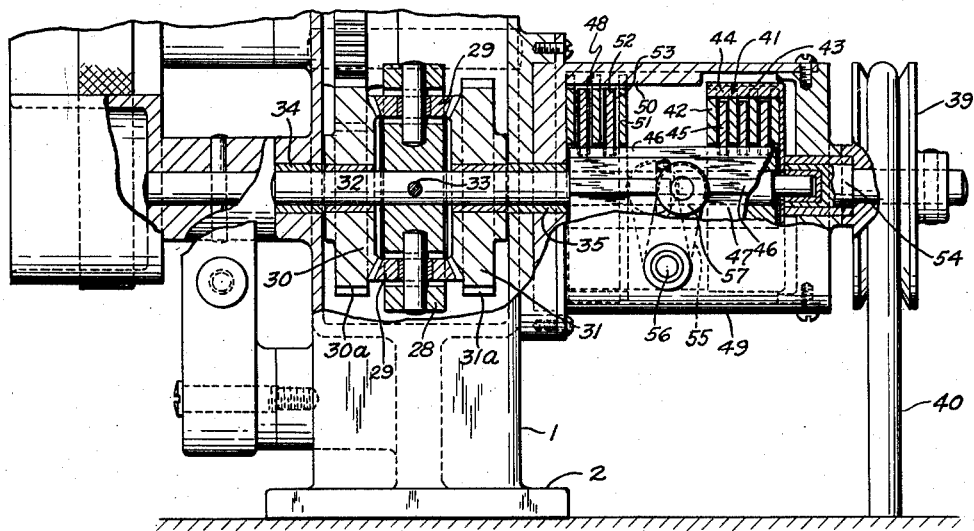
Fig. 10 is a partial elevation and a partial section of the main drive mechanism.

Between the windup device 21 and the measuring drums is a differential drive, in the present case a differential gear drive, which automatically permits variations in relative speeds by the windup device and the measuring drums to compensate for the increasing diameter of the ribbon on the spool as it piles up on it during the winding operation. This differential gear mechanism comprises a rotatable spider 28 (Figs. 1, 7 and 10) carrying one or more small bevel pinions 29. In the present case there are two of these pinions both meshing with beveled gears 30 and 31. The spider 28 is secured to the main drive shaft 32 by any suitable means such as the pin 33, and this shaft runs in suitable bearings 34 and 35 in the housing (Fig. 10). The beveled gear 30 is a combination bevel and spur gear, the spur gear part 30a meshing with an idler 36 which also meshes with one of the spur gears 27 as shown in Fig. 7. The bevel gear 31 is also a combination bevel and spur gear, the spur part 31a meshing with an idler 37 which meshes with another spur gear 38 mounted on the shaft 23 supporting the windup (see Fig. 1). It will therefore be evident that the windup and the measuring drums are connected through this differential gear mechanism.

The shaft 32 to which the spider 28 is attached is driven by the power pulley 39 through a releasable connection, (Figs. 1 and 10) the pulley in turn being driven by a belt 40 from any suitable source of power (not shown), but it will be evident I am not limited to this type of drive as the device may be driven from any suitable power source, such for example as an electric motor connected to the shaft carrying the pulley 39. Power is transmitted from this pulley to the shaft 32 by a friction clutch mechanism 41 (Figs. 1 and 10). This may be of any suitable type but in the present instance is shown as a multiple disc clutch in which alternate discs 42 are geared to the rotating outer drum 43 by ribs 44 on the inner side of the drum seating in between teeth in the periphery of the discs 42. The alternate discs 45 have grooves on their inner peripheries receiving ribs 46 on a sleeve 47 secured to the shaft 32 by a key or other suitable means so as to rotate the shaft. The drum 43 is connected to the pulley 39 through short shaft 54 so as to be driven thereby. Also associated with this clutch is a brake mechanism 48 (Figs. 1 and 10) by which the shaft and the device may be quickly stopped. For this purpose the inner walls of the housing 49 which encloses the clutch are provided with ribs 50 seating in notches in the outer peripheries of plates 51. Alternate with the plates 51 are other plates 52 having notches at their inner peripheries receiving the ribs 46 on the sleeve 47. The discs 45 and 52 may carry on their opposite surfaces friction faces 53 such as asbestos facing. Between the clutch 41 and brake 48 is a control means, which in the present instance comprises a forked lever 55 pivoted at 56, the arms of which each carry a roller 57 adapted to press either against the inner clutch disc 42 or the inner brake disc 51 to hold the clutch discs or the brake discs in engagement. It will be evident that when the fork 55 and rollers 57 are shifted to the right as viewed in Fig. 10 or upwardly as viewed in Fig. 1 the clutch discs will be engaged and the spider 28 will be driven by the pulley 39, but at this time the discs of the brake 48 are separated. However, if the fork 55 is shifted in the opposite direction the discs of the brake 48 are engaged while the clutch discs are separated. This of course releases the drive connection between the pulley 39 and the spider, and the brake 48 immediately stops rotation of the shaft 32 and the spider 28 to stop the entire mechanism.

It will be evident that by this drive mechanism both the measuring drums and the windup are driven from the pinions on the differential gear spider 28 (Figs. 1, 7 and 10), but that as the ribbon piles up on the windup or spool this increase in diameter is automatically compensated for by the differential gear mechanism which permits the windup spool to rotate at a slower speed relative to the speed of the measuring drum, and it does this without placing an objectionable strain on the ribbon, merely keeping the ribbon nicely taut so that it is wound at the desired uniform tension on the spool. It will be noted with this drive mechanism the pull of the ribbon being wound is not relied on to operate the measuring mechanism and therefore no objectionable strain is placed on the ribbon to stretch it or cause it to curl. That is, the measuring drum or drums and the windup are both driven by power independent of the ribbon and the ribbon being wound is therefore not used as a source of power for driving the measuring mechanism, and also the speed of the windup spindle in relation to the measuring drum automatically changes as more ribbon is wound on the spool, without putting any objectionable strain or stretch on the ribbon.

Control for tightness of wound ribbon

The degree of looseness or tightness with which the ribbon is wound is controlled by a simple adjustable friction device, one on the windup spindle and one on a measuring drum spindle. The one on the windup spindle is shown at 58 (Figs. 1 and 2) and the one on a measuring drum spindle is shown at 59 (Figs. 1 and 2). They are both of the same construction and comprise a member pivoted to the housing 1 at 60, said member being split to provide opposite arms 61 which are curved on their opposed faces to engage collars 62 and 63 secured to the respective spindles. An adjusting screw 64 passes through one arm and is threaded into the other arm with a spring 65 located between the head of this screw and the first arm. By adjusting this screw the friction of the arms 61 on the collars 62, 63 may be adjusted. The tighter the screw the greater the friction and when the screw is loosened the resiliency of the arms 61 causes them to move outwardly to decrease friction on the collars 62, 63. By adding to or increasing the friction on the windup spindle it causes the ribbon to be wound looser while adding to or increasing friction on the measuring drum causes the ribbon to be wound tighter. This provides a very simple, effective and reliable control for the tightness of the ribbon on the spool and permits it to be wound with uniform tension and gives a very fine control.

Measuring device

There is also a very effective control or measuring device for determining or measuring the amount of ribbon wound on the spool or reel. This device is driven from the power mechanism and therefore it is driven independently of the ribbon being wound so that it places no objectionable tension on this ribbon. This control or measuring device is shown in Figs. 1 and 11 to 16. Mounted on the top of the housing 1 is a smaller housing or shell 66. Mounted in a bearing 67 in the wall of the housing 1 is an upright shaft 68 extending into the shell 66. On the shaft in the housing is a gear 69 meshing with a pinion 70 on a sleeve 71 mounted on a stud 72 secured to the housing 1. The lower end of this sleeve 71 carries a worm gear 73 meshing with a worm 74 on the spindle 25 carrying the upper measuring drum 19. It will therefore be seen that the shaft 68 is directly connected with the drum 19 so that the number of revolutions of the shaft 68 depends on the number of revolutions of the measuring drum, and as indicated above as the measuring drums are driven from the power mechanism this shaft 68 is also driven from the power mechanism. The gears 74, 73 and 70, 69 form a reducing drive from spindle 25 to shaft 77.

Within the shell 66 is mounted an electrical insulating disc and support 75 (Fig. 11) which carries a bearing 76 for a spindle or shaft 77, the lower end of which has a bearing to receive the upper end 78 of the shaft 68. This shaft or spindle 77 also carries a clutch disc 79. Below this disc is a movable clutch disc 80 having a hub 81 provided with a groove 82 to receive rollers or studs 83 on the arms of the forked lever 84 pivoted at 85 in a bracket or support 86 secured to the shell 66. This lever serves to shift the clutch disc 80 to and from engagement with the disc 79, and one of said discs preferably carries a clutch facing 87 of fibre such as asbestos. The shaft 68 has longitudinal ribs 88 sliding in longitudinal grooves 89 in the hub 81 so that the shaft 68 drives the disc 80 but the disc is movable longitudinally on the shaft to and from the disc 79, the disc 80 having a bearing on the extension 78 of the shaft 68. A coil spring 90 tends to shift the disc 80 toward the disc 79 for frictional driving engagement. On the outer end of the lever 84 is a cam plate 91 (Figs. 9 and 12) having a cam edge cooperating with a roller 92 for controlling the position of the clutch 80 as will later be described. The plate 91 is preferably made adjustable to determine the proper operation of the clutch. In the present case it is pivoted to the lever at 93 and has an arcuate slot 94 through which extends a screw 95 for locking the plate in different angular positions.

The insulating support 75 carries a pair of metal (preferably copper) commutator rings 96 and 97, and they are preferably mounted by seating in grooves in the surface of the support. Secured to the upper portion of the shaft 77 by any suitable means such as a screw 98 is a collar or block 99. This block carries a trip switch comprising a bronze brush 100 having spaced fingers 101 adapted to engage the two commutator rings 96 and 97 to bridge these rings to close a control circuit for stopping the winding mechanism. This brush is mounted on a supporting block 102 (Fig. 16) of insulating material pivoted to the block 99 on a stud 103. This block carries a finger 104 (Figs. 11 and 16) projecting upwardly therefrom at one side of a finger 105 (Fig. 15) on a disc 106 (Figs. 13 and 15) pivoted at 106a on a plate 107 secured to the top of the block 99. Also pivoted to this plate at 108 is a trigger 109 having a finger 110 in front of the finger 105 and having a lug 111 adapted to seat in a recess 112 in the disc 106. A spring 113 has an arm passing through a slot 114 in plate 107 and connected to the disc 106 at 113a so as to tend to swing this disc to the left or counterclockwise as indicated by the arrow 115 in Fig. 15. A movement in this direction will permit the finger 104 to swing to the right as indicated in dotted lines Fig. 16 to throw the brush fingers 101 downwardly to engage the commutator rings 96 and 97 and thus close the circuit. Movement of the disc 106 in the opposite direction will swing the finger 104 back to move the brush fingers 101 off the commutator rings, as the finger 104 is connected to the finger 105 by any suitable means such as a wire loop 116. A spring 117 engages the outer edge of the trigger 109 as indicated at 118 and tends to throw this arm of the trigger inwardly to hold the lug 111 in the recess 112 and thus lock the disc 106 in the normal position of Fig. 15 with the brush fingers 101 lifted away from the commutator rings.

Figure 13:
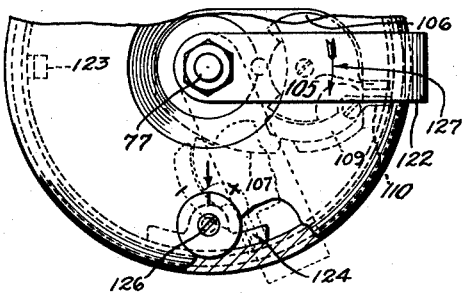
Fig. 13 is a top plan view of the device of Fig. 11 with parts broken away.
Figure 14:
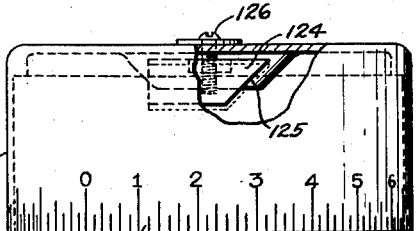
Fig. 14 is a side elevation of the adjustable drum for setting the measuring instrument.
Figure 15:
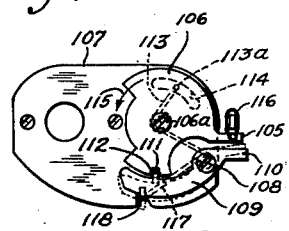
Fig. 15 is a top plan view of the automatic release for the stop mechanism.
Figure 12:
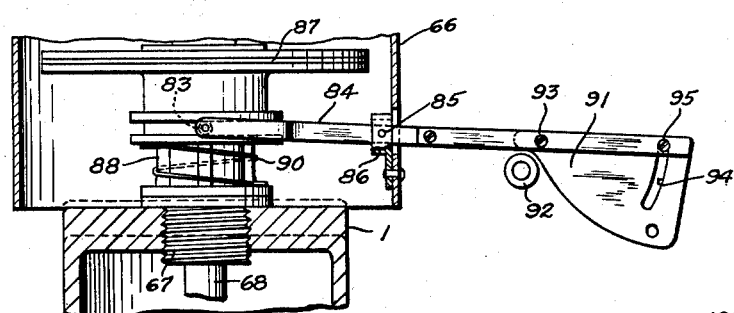
Fig. 12 is a detail section showing a portion of this mechanism looking from the right of Fig. 11.
Figure 16:
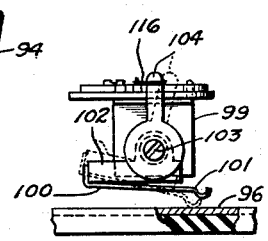
Fig. 16 is an elevation thereof looking from the right of Fig. 15.

Mounted on the top of the shell 66 is a cap or drum 119, this drum having an internal shoulder 120 resting on the top edge of the shell. This drum is mounted to turn on the shell for angular adjustment, but is sufficiently tight so that friction will hold it in adjusted position. If desired some means such for example as a set screw may be provided to hold it in adjusted positions. At its lower outer edge it is graduated as indicated at 121 to form a scale by means of which the device may be set to wind any given length of ribbon on a spool. Secured to the upper end of the shaft 77 is a finger or pointer 122 extending down to the scale 121 to indicate how the drum 119 is to be set. Carried on the inner surface of the shell 66 is a stationary stop 123 (Figs. 11 and 13), and carried by the drum 119 is an adjustable stop 124 (Figs. 13 and 14). The forward edge of this stop is inclined as indicated at 125, and the stop 124 may be adjusted up and down by a screw 126 to vary the position of the inclined surface 125 and thus make it possible to accurately set the inclined surface 125 with relation to the scale 121 and pointer 122 and to be engaged by the finger 110 of lever 109 at just the proper time to stop the mechanism and give more accurate measurements. This is described more fully in the next paragraph and in the description of the operation.

Below the disc or support 75 is a spiral spring 128 (Fig. 11) similar to a clockspring connected at one end as at 129 to the shell 66 and at its other end as indicated at 130 to the shaft 77 and the clutch disc 79. This spring tends to shift shaft 77 and with it block 99 and the trip switch carried thereby to the left or counterclockwise as viewed in Fig. 13, and carry the finger 104 against the stationary stop 123 to reset the trip mechanism and raise the brush fingers 101 from the commutator rings to open the circuit, and also limit the turning movement of the shaft 77 and the trip mechanism in this direction. This is the normal or starting position of the trip mechanism including the switch 100. The inclined edge 125 of the stop 124 carried by the adjustable cap or drum 119 is located in the path of movement of the finger 110 of the trigger 109 as the trip mechanism is carried to the right or clockwise as viewed in Fig. 13, and thus the angular distance at which the stop 124 is located from the stationary stop 123 in a clockwise direction as viewed in Fig. 13 will determine the length of ribbon which is wound on the spool, as will be more fully disclosed later in the description of the operation of the device.

Stopping mechanism

The clutch and brake mechanism 41 and 48 and the clutch 80 are controlled by an electromagnetic means, in the present case a solenoid 131 (Figs. 1 and 9), although a separate solenoid for each may be used if preferred. The core 132 of this solenoid is connected to an arm 133 of a yoke 134 extending between arms 135 and 136 pivoted to the casing by means of a shaft 137 which operates brake 138 (Fig. 1) controlling the spindle 25 for the upper measuring drum 19, this brake being enclosed within the walls 139. This brake is similar to brake 48, comprising alternate plates or discs connected respectively to the casing 139 and the spindle 25. The arms 135 and 136 each form one arm of a double bell crank lever, the other arms 140 of which carry the roller 92 cooperating with the cam 91. It will be seen from Fig. 1 the two arms 140 extend from levers 135 and 136 on opposite sides of casing 139. A coil spring 141 tends to hold this cam against the roller 92. The yoke 134 is formed to provide lugs 142 on the upper and lower sides of the arm 135 so as to permit a limited turning movement of the yoke 134 on the arms 135 and 136, the yoke 134 being pivoted to these arms by means of the shaft 143. This yoke also carries a spring finger 144 which engages the edge of a lever 145 secured to the shaft 56 which controls the fork 55 and thus the clutch 41 and brake 48. On the rear side of the housing 1 is mounted a bracket 146 to the upper end of which at 147 is pivoted a cam 148. This cam on the lower edge is provided with curved portions 149 and 150 between which is a recess 151, this cam edge resting upon a roller 152 carried by the upper end of the arm 145. A spring 153 connected at one end to the bracket 146 and at the other end to the cam plate 148 as indicated at 154 holds this plate against the roller 152. A spring 155 is connected at one end to the housing walls 139 as indicated at 156 and at the other end to the yoke 134 and therefore tends to hold this yoke, the levers 135 and 136, the arm 133 and the solenoid core 132 in the upper or raised position.

Figure 9:
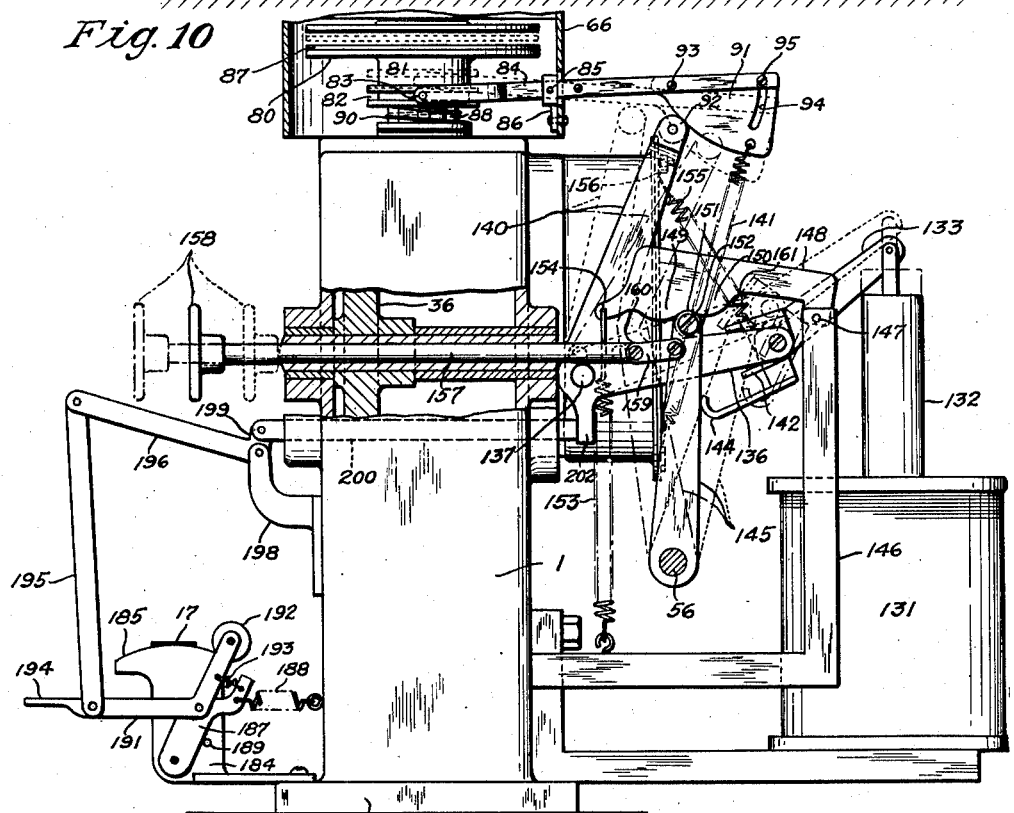
Fig. 9 is a side elevation of a portion of the automatic control with parts broken away to more clearly show the construction.
Figure 11:
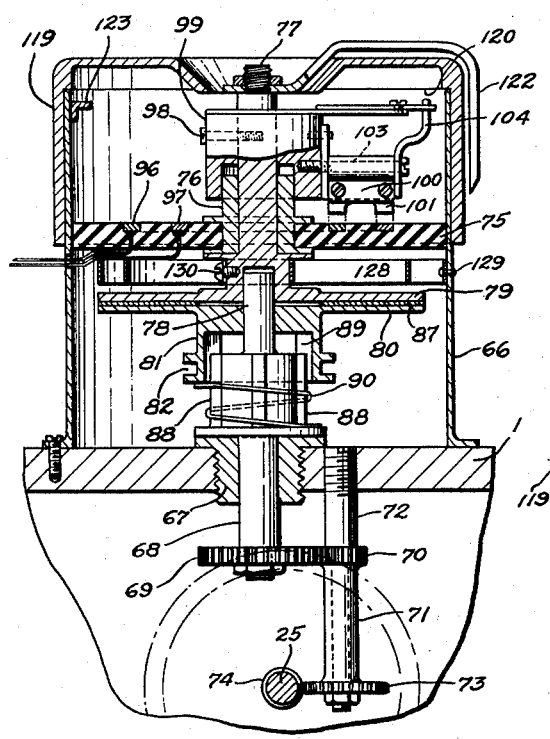
Fig. 11 is a vertical section of the control for the measuring mechanism.

Mounted to extend through the housing to the forward side thereof where it is easily accessible is a hand control comprising a rod 157 (Fig. 9) having a hand knob 158 on its forward end. This rod is connected by a link 159 to the lever arm 145 so that this lever arm and therefore the other levers connected therewith and the various clutch and brake controls can be shifted by the operator at will, it being understood that the lever 145 will be held in any one of three positions by the recesses 151, 160 and 161 in the lower edge of the cam plate 148 cooperating with the roller 152 on the upper end of the lever 145. These three positions correspond with the three positions indicated by the full lines, the dot and dash, and dotted lines, of the handpiece 158 and the corresponding positions of the various levers (Fig. 9). The full line position 39 shows the parts in the neutral or intermediate position at which time the clutch 41, the brake 48 and the brake 138 are all released. At the same time the brake 162 for the supply reel is also released as the electric control circuit is open and the solenoid 167 deenergized. This leaves all the mechanism free to be operated by the operator in threading a ribbon through the measuring drums and also adjusting the position of the windup and supply reels. In this position the driving clutch 80 to the measuring control and trip mechanism is also released.

The brake 162 (Fig. 1) for the supply reel shaft 5 is enclosed in a casing 163 and is similar to brake 48 comprising alternate discs or plates secured to the casing 163 and the supply reel spindle 5 respectively. It is controlled by a shaft 164 through a lever 165 connected to a core 166 of the solenoid 167 (Fig. 1). As will be seen from Fig. 17 the solenoids 131 and 167 are connected with the commutator rings 96 and 97 and with a source of current supply 168 through the leads 169, 170 and 171. Thus when the commutator rings are bridged by the brush 100 the solenoids are energized, the solenoid 131 releasing the clutch 41 and applying the brake 48 to stop the drive mechanism and thus the windup reel, the brake 138 is set to stop the measuring drums, and the brake 162 is set to stop rotation of the supply reel. As soon as the circuit is broken the solenoids are deenergized releasing the brake 162, but the brakes 48 and 138 are not released until the hand piece 158 is shifted to the intermediate or full line position of Fig. 9.

Ribbon splice controlled stop

Figure 17:
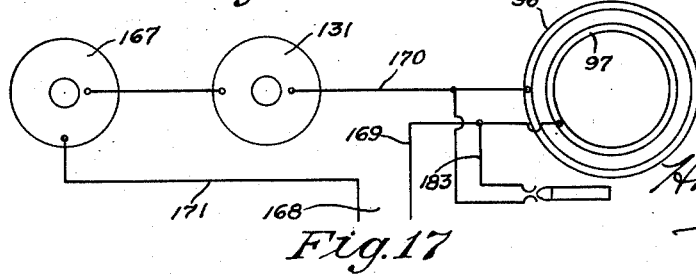
Fig. 17 is a wiring diagram.

Means is provided for automatically stopping the machine should an overlapping joint or connection between two strips of ribbon or an unusually thick portion in the ribbon, pass toward the winding reel. This is shown in Figs. 2, 4 and 5, and comprises a pin 172 mounted to slide in a bracket 173 secured to the front of the housing 1 adjacent one of the measuring drums, in the present case the upper drum 19. A spring 174 tends to press the head 175 of this pin against the ribbon 17 passing over the drum 19. The opposite end of pin 172 is connected at 176 with a lever 177 pivoted at 178 to an arm 179 secured to the housing 1. At the opposite end of the lever 177 is a contact 180, and adjacent the free end of this contact are two spaced spring contacts 181 insulated from each other, as by mounting in an insulating block 182, and are electrically connected by leads 183 to the solenoid circuit as shown in Fig. 17. These contacts 181 are normally spaced from the contact 180 but should a hump or overlapping joint 17a (Fig. 4) in the ribbon pass under the head 175 it will push the pin 172 outwardly and through the motion magnifying lever 177 will shift the contact 180 into engagement with the contacts 181 to close the circuit through the solenoids and thus stop the machine. This will mean that the ribbon partially wound on the windup reel or the partially wound reel must be removed and a new reel started, as it is not allowable to permit these spliced connections to be wound on the typewriter spools.

Ribbon cutoff device

Means is also provided for cutting off the ribbon after a winding operation has been completed, and this may be arranged to be operated automatically as the machine is stopped at the end of the winding operation, and it may also be operated by hand at any time at the will of the operator. This is shown in detail in Figs. 6 and 8 and comprises a bracket 184 secured to the housing 1 and having a curved upper wall 185, this curve being struck about a pivot 186 as a center. A lever 187 is pivoted to the bracket at 186 and a spring 188 normally holds this lever to its right hand or inward position against a stop 189. Pivoted to this lever at 190 is a bell crank lever 191, one arm of which carries a knife disc 192 having a sharp edge running over the curved surface 185. A spring 193 connecting the two levers holds the second lever in the normal right hand position or full line position of Figs. 6 and 8. The other arm of the bell crank 191 has a hand piece 194. The operator by merely pressing downwardly on this hand piece draws the roller 192 forwardly over the curved wall 185. This curved wall is so located that the ribbon 17 passes over it from the measuring drum 20 to the windup reel 21 and therefore the passage of this cutter forwardly will sever the ribbon.

It will be seen that by mounting the bell crank 191 on the lever 187 downward pressure on the hand piece and left hand arm of the bell crank will press the cutting disc 192 down against the curved surface 185 and thus insure the cutting off of the ribbon, the pressure on the bell crank first pressing the cutter against the curved surface and then shifting the cutter forwardly over this surface while it is still held against the surface, by movement of the lever 187 forwardly about the pivot. This cutter may also be operated automatically when the machine is stopped if desired. For this purpose I have shown a link 195 connected to the bell crank 191 and to the long arm of the lever 196 pivoted at 197 to a bracket 198. The short arm 199 of this lever is connected to a rod 200 mounted to slide in a suitable bearing 201 in the housing 1 and projecting at the rear thereof in front of a lug 202 on the bell crank 136, 140 (see Fig. 9). It will thus be seen that as the lever 136 drops under action of the solenoid 131 the lug 202 will shift the rod 200 and will swing the cutter disc 192 forwardly to cut off the ribbon the same as would the hand operation by pressing down on the hand piece 194. As the end of rod 200 is not connected to the lug 202 the cutoff device may be hand operated by depressing hand piece 194 when the lever 145 and those associated therewith are in the intermediate or neutral position.

The support for the windup reel 21 should be constructed to hold all types of typewriter ribbon reels. In the present case the enlarged collar 62 on the spindle 23 carries a pin 203 projecting forwardly therefrom to enter into a notch or groove 204 in the hub 205 of the reel. This hub 205 can be slid onto the reduced end 206 of the spindle and held thereon by a thumb screw 207.

Operation

The operation is as follows:

When the machine has been stopped by the automatic mechanism through the excitation of the solenoids the lever 140 is in the dot and dash position of Fig. 9 and the lever 145 is in the left hand or dot and dash position with the roller 152 seated in the left hand recess 160 of the cam plate 148. The other associated levers 135, 136 and 133 are also in their lowermost positions. When the levers are in these positions the hand piece 158 is in its outermost position as shown in dot and dash lines Fig. 9, the main driving clutch 41 is released and the brake mechanisms 48, 138 and 162 are applied so that the windup reel, the measuring drums and the supply reels are held stopped by these brakes. The driving clutch 80 for the automatic control switch 100 is however released by the roller 92 on the cam plate 91.

The operator now pushes in the hand piece 158 to the intermediate or full line position of Fig. 9. This moves the roller 152 on the lever 145 to the intermediate notch 151 in the cam plate 148. In this position the main driving clutch 41 is released, the brakes 48, 138 and 162 are released, and the driving clutch 80 for the trip switch is released. The various devices therefore are now free to be operated by hand by the operator for applying the supply reel, threading the ribbon through the measuring drums and starting it on the windup reel, and operation of the measuring drums will not affect the automatic cutoff or control switch 100 in the shell 66.

After the operator has suitably threaded the ribbon over the measuring drums and started it on the windup reels the device is ready for winding operation. To start this all the operator does is to push the hand knob 158 inwardly from the full line position of Fig. 9 to the inner or dotted line position. This shifts the lever 145 to the right to the dotted line posiion of Fig. 9 and brings the roller 152 into the recess 161 of the cam plate 148 so that this cam plate retains this lever in this position. The movement of this lever to this position swings the rollers 57 against the inner clutch plate 42 of the clutch 41 which therefore connects the driving pulley 39 to the shaft 32. As this is the main drive shaft and drives the differential drive spider 28 this differential drive drives the windup reel through the gears 37 and 38 and drives the measuring drums 18, 19 and 20 through the gears 36 and 27. These measuring drums draw off the ribbon from the supply reel 4 and it is wound up on the windup reel 21. It will thus be seen that the measuring drums and the windup reel are driven from the power device, and they are connected to the differential drive so that as the ribbon piles up on the windup reel, and therefore the effective diameter of this reel increases, the speed of the reel is automatically adjusted to the speed of the winding drum. It will further be seen that the pull of the windup reel on the ribbon is not employed to drive the measuring drums and therefore no objectionable tension is placed on the ribbon to tear it, stretch it, or cause it to curl, but that the ribbon is wound with uniform tension which may be adjusted by the two friction devices 58 and 59 to give just the tightness desired on the wound reel.

The movement of the lever 145 to this dotted position pushes on the spring arm 144 to raise the lever arm 136 and with it the yoke 134 and the associated parts. This also swings the lever arms 140 to the left to the dotted line position of Fig. 9. This causes the roller 92 to run off the cam 91 and thus cause the clutch 80 to be engaged by the springs 90 and 141 and thus cause rotation of the shaft 77 through the reducing gear drives 73 and 74 and 69, 70. This slowly rotates the block 99 carrying the switch 100 and the trip mechanism.

It will of course be understood that before the machine has been set in operation the cap or drum 119 has been turned or adjusted to the proper position as indicated by the scale 121 and pointer 122 to give the proper length of ribbon on the windup reel. This adjustment of the drum has placed the stop cam 125 at the proper distance to the right or clockwise of the stationary stop 123. In the normal position before the machine is started the finger 104 is held against the stationary stop 123 by the spring 128 (Fig. 11) turning the shaft 77 and the block 99 backwardly or counterclockwise as viewed in Fig. 13. Now as the machine continues to operate to wind up the ribbon on the reel the shaft 77 and the block 99 with the automatic trip switch carried thereby is rotated slowly to the right or clockwise as viewed in Fig. 13. When the proper amount of ribbon has been wound on the windup reel 21 the finger 110 (Fig. 15) of the trigger 109 engages the inclined surface 125 of the stop 124. This immediately operates the trigger 109 to release the disc 106 which is thus immediately swung to the left or counterclockwise as viewed in Fig. 15 to throw the finger 104 to the right (Fig. 16) to carry the contact fingers 101 down into engagement with the commutator rings 96 and 97. This immediately closes the circuit through the solenoids 131 and 167 which therefore draws down the levers 133 and 165.

Drawing down the lever 133 draws down the yoke 134 and with it the arms 135 and 136. The pressure of the finger 144 on lever 145 throws this lever to the left (Fig. 9) to the dot and dash line position with the roller 152 in the notch 160 in the cam plate 148. This movement of the lever 145 releases the main drive clutch 41 and throws the rollers 57 over against the inner brake disc 51 to set the brake 48. This immediately stops the differential drive and the windup reel. Downward movement of the levers 135 and 136 sets the brake 138 to stop the measuring drums 18, 19 and 20 and the downward movement of the lever 165 sets the brake 162 to stop the supply reel. The fork provided by the spaced lugs 142 on the opposite sides of lever 135 permits a limited relative movement between the levers 135 for setting the brake 138 and the lever 145 for setting the brake 48 so that should one brake engage before the other it will not prevent the second brake from being properly set.

It will thus be seen that as soon as the switch 100 is tripped the whole machine stops immediately. Furthermore the swinging of the lever 136 downwardly swings levers 140 to the right (Fig. 9) under the cam 91 thus raising this cam to release the clutch 80. Just as soon as this clutch is released the spring 128 turns the shaft 77 with its block 99 and the switch mechanism to the left or counterclockwise as viewed in Fig. 13. As these swing back the finger 104 is carried against the stationary stop 123 and it is swung from the dotted line position (Fig. 16) to the full line position. This raises the contact fingers 101 away from the commutator rings 96 and 97 to thus open the circuit and it also resets the trip switch mechanism in the normal position of Figs. 15 and 16. It will thus be seen that the trip is automatically returned to the normal starting position, and it is also immediately automatically reset so that it is ready for the next winding operation. As the lever 136 is shifted downwardly it shifts the rod 200 (Figs. 8 and 9) to the left to operate the cutoff mechanism for the ribbon. All the operator has to do now is to remove the windup reel and apply a new empty reel to the windup spindle. He can release the entire mechanism so as to start the ribbon on this reel merely by pushing the hand knob 158 (Fig. 9) from the outer or dot and dash position to the inner or full line position as indicated above.

Having thus set forth the nature of my invention, what I claim is:

1. In a spooling and measuring machine for a ribbon or the like, a supply reel, a winding spool, a measuring drum over which the ribbon passes on its way from the reel to the spool, and means for driving the drum and spool including a drive connection between the drum and spool comprising a differential gear to permit automatic variations in the relative speeds of the drum and spool as the effective diameter of the spool varies as material is wound on it.

2. In a spooling and measuring machine for a ribbon or the like, a windup for the ribbon, a measuring drum over which the ribbon passes on its way to the windup, means for driving the windup and drum including a differential gear between the drum and windup to permit automatic variations in the relative speeds of the drum and windup, means for stopping the drum and windup, and means operated in unison with the measuring drum for controlling said stop means.

3. In a spooling and measuring machine for ribbon or the like, a windup for the ribbon, a measuring drum over which the ribbon passes on its way to the windup, a differential drive connection between the drum and the windup including a gear connected to the drum, a second gear connected to the windup, a rotary spider between the gears, a pinion on the spider meshing with both gears, and means for rotating the spider to drive the drum and windup.

4. In a spooling and measuring machine for ribbon or the like, a windup for the ribbon, a measuring drum over which the ribbon passes on its way to the windup, a driving means for the drum and a driving means for the windup, a differential drive between said driving means to permit automatic variations in the relative speeds of the drum and windup, and an adjustable means for applying a friction to one of said driving means to control the tension on the ribbon as it is being wound.

5. In a spooling and measuring machine for ribbon or the like, a windup for the ribbon, a measuring drum over which the ribbon passes on its way to the windup, a drive for the drum including a gear connected therewith, a drive for the windup including a gear connected with it, a rotating spider, a pinion carried by the spider meshing with both gears, means for rotating the spider to rotate the gears, and adjustable means for applying a friction to one of said drives to control the tension on the ribbon during the winding operation.

6. In a spooling and measuring machine for ribbon or the like, a windup for the ribbon, three measuring drums arranged one between and to one side of the other two, the ribbon passing about all three on its way to the windup, a gear drive connecting the drums to drive them in unison, and a differential drive between one of said drums and the windup to permit variations in the relative speeds of the drums and windup.

7. In a spooling and measuring machine for ribbon or the like, a rotatable support for a supply reel, a windup for the ribbon, a measuring drum between said support and the windup over which the ribbon passes, driving means for the drum and windup including a differential drive between the drum and windup to permit variations in the relative speeds of the drum and windup, means for stopping the support, the drum and the windup respectively, and separate means operated in unison with the drum for simultaneously controlling the operation of all of the stop means.

8. In a spooling and measuring machine for a ribbon or the like, a winding spool, a measuring drum over which the ribbon passes on its way to the spool, a differential gear drive including a spider carrying one or more pinions meshing on opposite sides with gears, means for driving the spider, a driving connection from one side of said gear drive to the winding spool, a driving connection from the other side of said gear drive to the drum, a control device, a reducing drive from the drum drive to the control device, so that the control device is operated in definite predetermined relation to the movements of the drum, and means operated by said control device after it has made a given movement to stop the drum and spool.

9. In a spooling and measuring machine for a ribbon or the like, a windup for the ribbon, a measuring drum over which the ribbon passes to the windup, means for driving the drum and windup including a source of power and a clutch drive and a differential drive between the drum and the windup to permit automatic variations in the relative speeds of the drum and windup, brake means for arresting movement of the drum and windup, and means operated in timed relation with said drum to release the clutch and set the brake means after a given length of ribbon has been wound.

10. In a spooling and measuring machine for a ribbon or the like, a windup for the ribbon, a measuring drum over which the ribbon passes to the windup, means for driving the drum and windup, and means for automatically stopping the drum and windup after a determined length of ribbon has been wound including a brake means, a carrier for an electric switch, a reducing drive from the drum operating means to the carrier, electrical means controlled by said switch to operate the brake means, trip mechanism normally holding the switch in open position, and an adjustable stop for releasing the trip mechanism after it has made a given movement to close the switch and operate said electrical means.

11. In a spooling and measuring machine for a ribbon or the like, a windup for the ribbon, a measuring drum over which the ribbon passes to the windup, means for driving the drum and windup, a control device comprising a rotary support, a reducing drive from said driving means to the support including a clutch, a brake means for stopping the drum and windup, an electrical means for operating the clutch and brake means, a switch on said support for controlling said electrical means, a trip mechanism normally holding the switch in open position, an adjustable stop in the path of movement of the trip mechanism to release the trip to close the switch after the support has made a given movement, a stationary stop, and a spring connected with the support to move it in the reverse direction against said latter stop after the clutch has been released to reset the trip mechanism and open the switch.

12. In a spooling and measuring machine for a ribbon or the like, a windup for the ribbon, a measuring drum over which the ribbon passes to the windup, means for driving the drum and windup including a main drive shaft, a driving clutch for said shaft and a brake for stopping the shaft, means between the clutch and brake for controlling their operation and adapted to be moved to an intermediate position to release both the clutch and brake, automatic means driven in timed relation with said drum to operate said clutch and brake control means after a determined movement of the drum to release the clutch and set the brake, and hand operated means to shift the clutch and brake control means to the intermediate position.

13. In a spooling and measuring machine for a ribbon or the like, a windup for the ribbon, a measuring drum over which the ribbon passes to the windup, means for driving the drum and windup including a clutch and brake mechanism, means operated in timed relation with said drum to release the clutch and set the brake mechanism after a given length of ribbon has been wound, a cutoff means for the ribbon between the drum and the windup, and means controlled by said clutch release and brake setting means to operate said cutoff means when the brake is set.

14. In a winding and measuring device for ribbon or the like, a windup, a measuring drum over which the ribbon passes to the windup, a cutoff device between the drum and windup comprising a curved surface over which the ribbon passes, a lever pivoted below said surface, a second lever pivoted to the first lever between its pivot and the surface, a cutter wheel mounted on the second lever to move over the curved surface, and means for operating said second lever to pass the cutter over said surface.

HARVEY V. MITCHELL.